United States Patent
Gall

(10) Patent No.: US 6,369,346 B1
(45) Date of Patent: Apr. 9, 2002

(54) METHOD FOR WELDING A DOUBLE LAYER SHEET TO A JOINTING SHEET

(75) Inventor: Hans-Dieter Gall, Duisburg (DE)

(73) Assignee: Thyssen Krupp Stahl AG, Dusseldorf (DE)

(*) Notice: Subject to any disclaimer, the term of this patent is extended or adjusted under 35 U.S.C. 154(b) by 0 days.

(21) Appl. No.: 09/647,223

(22) PCT Filed: Mar. 2, 1999

(86) PCT No.: PCT/EP99/01343

§ 371 Date: Dec. 6, 2000

§ 102(e) Date: Dec. 6, 2000

(87) PCT Pub. No.: WO99/51383

PCT Pub. Date: Oct. 14, 1999

(30) Foreign Application Priority Data

Apr. 7, 1998 (DE) .......................................... 198 15 476

(51) Int. Cl.[7] .............................................. B23K 11/00
(52) U.S. Cl. .................................. 219/117.1; 219/91.21
(58) Field of Search ............................ 219/117.1, 118, 219/91.21, 91.22, 91.23, 119

(56) References Cited

FOREIGN PATENT DOCUMENTS

| DE | 43 32 730 C | 3/1995 |
|----|-------------|--------|
| DE | 195 03 166 A | 8/1996 |
| JP | 60 213370 A | 10/1985 |
| JP | 63 264279 A | 11/1988 |
| JP | 06 115687 A | 4/1994 |
| JP | 06 246462 A | 9/1994 |
| WO | WO 97/30817 | 8/1997 |

OTHER PUBLICATIONS

"Resistance Welding," Wallace A. Stanley, 1950, pp. 176–177.

*Primary Examiner*—Tom Dunn
*Assistant Examiner*—Colleen P. Cooke
(74) *Attorney, Agent, or Firm*—Prokauer Rose LLP

(57) ABSTRACT

The invention relates to a method for welding a double layer sheet metal (1, 2) having an intermediate layer (5), in particular, a sheet metal with knobs, with a bonding sheet metal (8) by spot or roll seam welding. Before welding of the bonding sheet metal (8) with the two cover sheet metals (1, 2), spaced apart by the intermediate layer (5) of the double layer sheet metal, is carried out, the area (11) about the welding location (12) is burned free of the intermediate layer (5) by the current which is introduced over a large surface area into the cover sheet metals (1, 2) via the welding electrodes (9, 10) placed thereat and guided via a shunt adjacent to the welding location (12). Only thereafter, the sheet metals are brought into conducting contact with one another by a directed local pressure application, and the welding process is carried out.

7 Claims, 2 Drawing Sheets

METHOD FOR WELDING A DOUBLE LAYER SHEET TO A JOINTING SHEET

Figure 1:
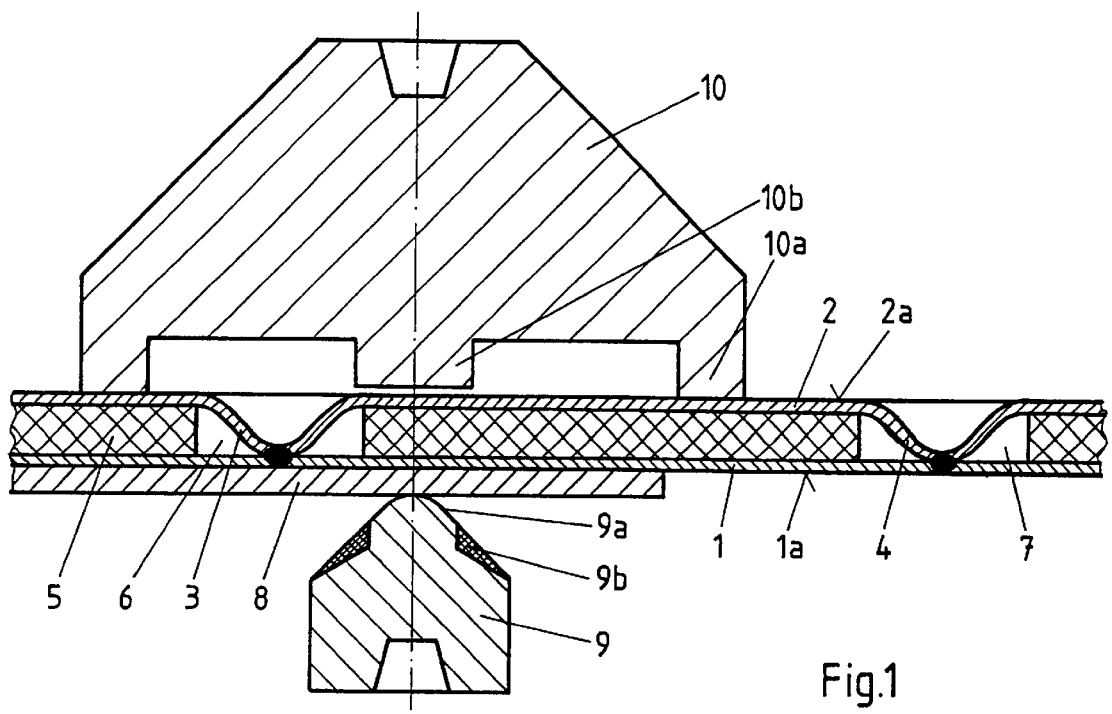

The invention relates to a method for welding a double layer sheet metal, comprised of two cover sheet metals and an intermediate layer of a combustible material, in particular, of impregnated paper, with a bonding sheet metal by resistance or resistance roll seam welding, wherein the first cover sheet metal rests against the bonding sheet metal and one of the oppositely positioned welding electrodes contacts the second cover sheet metal and the other one of the welding electrodes contacts the bonding sheet metal, respectively, for performing the welding process, so that the current between the welding electrodes first flows via the second cover sheet metal, at least one shunt positioned adjacent to the welding location, the first cover sheet metal, and the bonding sheet metal, so that thereby the intermediate layer is heated and removed in the area of the welding location and, subsequently, the cover sheet metals, with the bonding sheet metal, are welded together by directly contacting one another.

Double layer sheet metals are known in various embodiments. In a known method for manufacturing such a double layer sheet metal of the aforementioned kind (Patent Abstracts of Japan, vol. 013, No. 060 (M-796), Feb. 10, 1989, and JP 63 264279 A; and Patent Abstracts of Japan, vol. 10, No. 301 (M-525), Jun. 3, 1986, and JP 61 115687 A), one of the cover sheet metals and the bonding sheet metal are contacted by two electrodes which are of identical size and limited to the area of the welding location. The shunt is formed by an outer bridge which contacts one of the cover sheet metals and the bonding sheet metal far outside of the welding location. In order to prevent that, when a voltage is applied, the current density at the relatively small contact locations of the welding electrodes is too great, the first mentioned prior art proposes to affect the current conduction by controlling the applied voltage such that, first, a current of low current intensity flows which results in melting of the intermediate layer comprised of resin. As soon as the two cover sheet metals, with displacement of the melted intermediate layer, have been contacted as a result of the clamping force acting on the one cover sheet metal and the bonding sheet metal, which can be detected by a change of the applied voltage, the current between the electrodes can flow directly via the cover sheet metals and the bonding sheet metal. From this point in time on, the current is increased to the required welding current intensity and the welding connection between the bonding sheet metal and the cover sheet metals is produced. This method thus requires current and voltage control during the bonding process.

In a known double layer sheet metal (DE 195 03 166 A1), of which at least one cover sheet metal has knobs, the two cover sheet metals are welded to one another at the end faces of the knobs wherein, however, not all knobs must be welded to the other cover sheet metal. Such double layer sheet metals are characterized by a high geometrical moment of inertia while having a relatively small weight per surface area. Because of this property, they are pre-destined to be used in motor vehicles.

Moreover, it is known to fill the hollow space between the two cover sheet metals with a filler. This filler can act as a reinforcing means and as a noise dampening means. The manufacture of such a double layer sheet metal with an intermediate layer is carried out such that the intermediate layer is placed as a perforated mat onto the sheet metal with knobs such that the end faces of the knobs are exposed. Accordingly, after placement of the other cover sheet metal, the two cover sheet metals can be welded together without problems at the directly contacting end faces of the knobs by resistance welding.

In contrast, the welding of such a double layer sheet metal with a bonding sheet metal by resistance welding is a problem because of the insulating intermediate layer. Welding of the bonding sheet metal with the double layer sheet metal in the area of the end faces of the knobs can be carried out without problems, but not on locations where between the two cover sheet metals the insulating intermediate layer is positioned. Welding experiments on double layer sheet metals with cover sheet metals of 0.2 to 0.4 mm thickness by means of conventional welding electrodes with spherical contact surfaces, wherein one of the welding electrodes contacts directly the sheet metal with knobs and the other welding electrode is contacted indirectly via the bonding sheet metal with the sheet metal with knobs, have shown that, in particular, an annular melt through of the sheet metal with knobs that is contacted directly by the welding electrode can occur. A high-strength connection of the bonding sheet metal with both cover sheet metals of the double layer sheet metal can therefore not be achieved.

It is an object of the invention to develop a method which ensures that a bonding sheet metal can be connected by resistance welding with both cover sheet metals of a double layer cover sheet metal with insulating intermediate layer.

This object is solved with a method of the aforementioned kind such that one of the welding electrodes contacts the second cover sheet metal with a surface area that is at least ten times as large as the cross-sectional surface area of the welding location, that the flowing current burns off, without melting it, the intermediate layer in the area of the welding location by controlled heating of the cover sheet metal and that, subsequently, after the welding location has been completely burned free, both cover sheet metals are brought into electrically conducting contact with the bonding sheet metal by a directed local pressure application only at the welding location and are then welded together therewith.

With the method according to the invention a welding connection of the bonding sheet metal with both cover sheet metals is obtained, because, upon placement of the one welding electrode, as a result of the very large contact surface of the one welding electrode, a current density that is too great and thus overheating of the cover sheet metals at the welding location are prevented, without requiring a limitation of the current flowing during the individual phases of the method. The current flowing in the cover sheet metals is distributed onto a large cross-sectional surface area and results initially only in that the insulating intermediate layer, which is disruptive for the welding process, is burned off at least in the direct surroundings of the welding location. Only thereafter a direct contact of the cover sheet metals at the welding location occurs. Then there is no longer the risk of burning through or of an annular eroding by heat at the contact location of the cover sheet metal at the welding electrode. A sufficiently large current conduction for the burning off process is made possible by the shunt. In the case of a sheet metal with knobs, the shunt may be the knobs to be welded to one another. In a double layer sheet metal without such contact-providing knobs, an artificial contact bridge can be produced between the two double layer sheet metals.

There are several possibilities for the purpose of preventing a current density that is too great at the time of positioning the welding electrodes. According to a first alternative, it is suggested that for the large surface area contacting by one of the welding electrodes, a plate-shaped welding electrode or a ring-shaped welding electrode with a central support pin is used. According to a second alternative solution it is suggested that a lost sheet metal piece is used between the welding electrode and the cover sheet metal which is then also connected by welding. Such a lost sheet metal piece has a also a further advantage because it provides reinforcement.

In order to ensure a direct contact of the cover sheet metals after burning off the intermediate layer, according to one embodiment of the invention it is suggested that the other welding electrode is a welding electrode having a spherical contact surface. When pressure loading occurs, the welding electrode with the spherical contact surface presses via the bonding sheet metal the cover sheet metal into the hollow space of the double layer sheet metal and brings it into contact with the other cover sheet metal.

Figure 2:
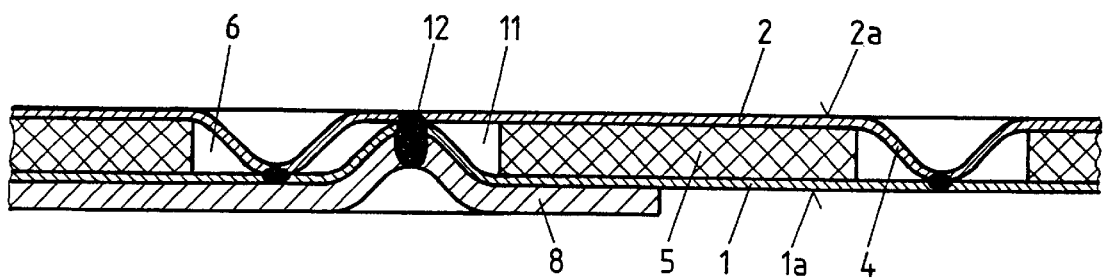
Figure 3:
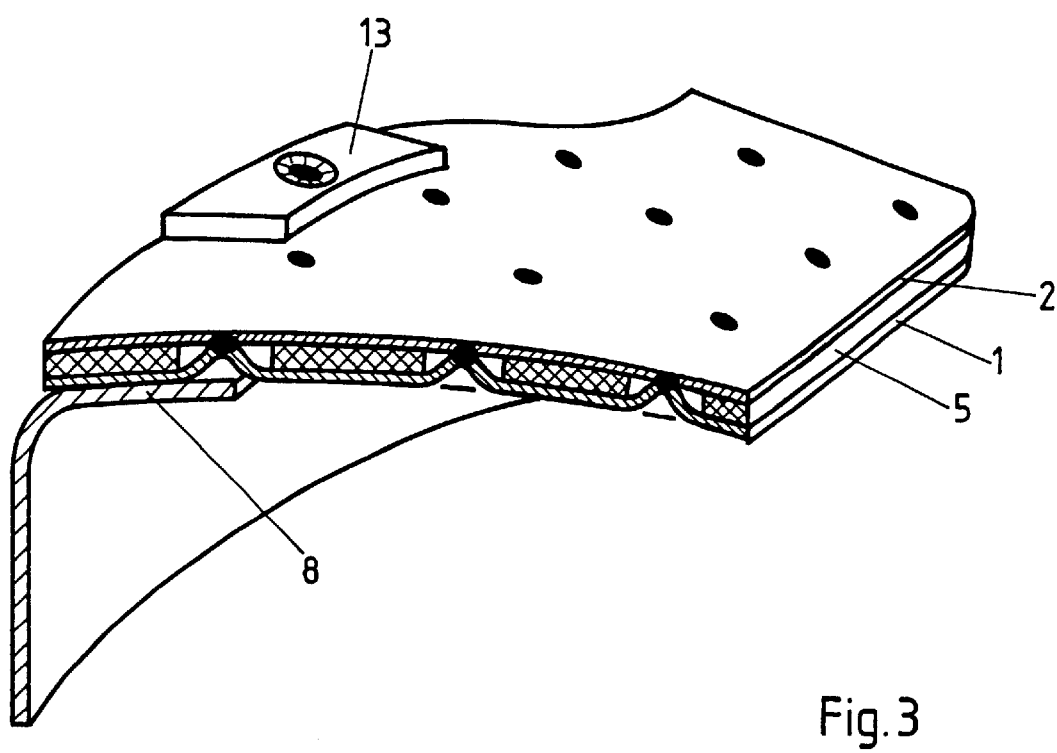

In the following the invention will be explained in more detail with the aid of an embodiment illustrated in the drawing. It is shown in detail in:

FIG. 1 a schematic representation in axial section of a double layer sheet metal and bonding sheet metal, arranged between two welding electrodes, at the moment of contacting;

FIG. 2 the double layer sheet metal and the bonding sheet metal according to FIG. 1 after the welding process; and FIG. 3 a double layer sheet metal with bonding sheet metal and a lost sheet metal piece after the welding process in an isometric representation.

The double layer sheet metal illustrated in FIG. 1 is comprised of two cover sheet metals 1, 2 made of steel with a characteristic thickness of 0.2 to 0.4 mm. The lower cover sheet metal 1 illustrated in the drawing is flat, while the upper cover sheet metal 2 is provided with knobs 3, 4. The two cover sheet metals 1, 2 are welded together at the end faces of the knobs 3, 4. An intermediate layer 5 of impregnated paper in the form of a perforated mat is positioned between both cover sheet metals 1, 2. The holes 6, 7 in the intermediate layer 5 correspond with the knobs 3, 4 so that during welding of the two cover sheet metals 1, 2 they directly contact one another via the end faces of the knobs 3, 4. For a conventional knob depth of scantly 2 mm and a sheet metal thickness of 0.2 to 0.4 mm, this results in a double layer sheet metal of approximately 2 mm total thickness.

For such a double layer sheet metal 1–7 it is now desired to connect a bonding sheet metal 8 made of steel with a characteristic thickness of between 0.5 and 1 mm by resistance welding and, in particular, by spot or roll seam welding, with the double-layer sheet metal 1, 2. For welding, the bonding sheet metal 8 is placed flat against the outer side 1a of the inner cover sheet metal 1, as illustrated in FIG. 1. Subsequently, the welding electrodes 9, 10 are placed thereagainst from both sides. As can be seen, the axes of the welding electrodes 9, 10 are located in the area of the insulating intermediate layer 5 and not within the area of a knob 3, 4.

While the lower welding electrode 9 has a spherical contact surface 9a with a ceramic ring or PTFE ring 9b placed there about, which in the case of galvanized sheet metal is designed to prevent an annular zinc formation on the bonding sheet metal crater, the upper welding electrode 10 is a ring-shaped electrode. It has a contact ring 10a and a central support pin 10b which is slightly recessed so that, upon placement of the welding electrode 10 onto the outer side 2a of the cover sheet metal 2 provided with knobs, it does not yet contact, in contrast to the ring contact 10a. As soon as now current is supplied to this constellation, this current is distributed over a large surface area into the cover sheet metals 1, 2 wherein the areas welded to one another form a shunt via the knobs 3, 4. For such a contact arrangement and current introduction into the double layer sheet metal 1–7, a very strong heating of the cover sheet metals 1, 2 results because of the especially high current density in the direct vicinity of the lower welding electrode 9 and thus also in the area 11 of the future welding location 12, which causes the burning off of the insulating intermediate layer 5 in this area 11 of the welding location 12, which, however, is not so great that it would cause melting/melting away of, for example, the upper cover sheet metal 2, in this area. Since the welding electrodes 9, 10 are loaded by pressure and the pressure loading continues, the lower welding electrode 9 presses with its spherical contact surface the bonding sheet metal 8 and the lower sheet metal 1 into the free space provided by the burning off of the intermediate layer 5 so that the lower cover sheet metal 1 can contact directly the upper cover sheet metal 2. In this context, the support pin 10b supports the upper cover sheet metal 2. In final analysis, one obtains in this way a welding connection between the bonding sheet metal 8 and the double layer sheet metal in which the two cover sheet metals 1, 2 are welded to the bonding sheet metal 8.

In the embodiment according to FIG. 3, instead of the ring-shaped welding electrode 10, a lost sheet metal piece 13 is used. In this case, the same welding electrode as the welding electrode 9 of the embodiment according to FIG. 1 can be placed against this sheet metal piece 13.

Inasmuch as double layer sheet metals without knobs are to be connected by welding with a bonding sheet metal, a shunt can be produced in that, laterally adjacent to the future welding location, an electrical bridge is connected to the bonding sheet metal which is in connection with the oppositely positioned cover sheet metal.

What is claimed is:

1. A method for welding a double layer sheet metal (1, 2, 5), comprised of two cover sheet metals (1,2) and an intermediate layer (5) of a combustible material, with a bonding sheet metal (8) by resistance or resistance roll seam welding, wherein the first cover sheet metal (1) rests against the bonding sheet metal (8) and one of the oppositely positioned welding electrodes (9, 10) contacts the second cover sheet metal (2) and the other one of the welding electrodes contacts the bonding sheet metal (8), respectively, for performing the welding process, so that the current between the welding electrodes (9, 10) first flows via the second cover sheet metal (2), at least one shunt (3, 4) positioned adjacent to the welding location (12), the first cover sheet metal (1), and the bonding sheet metal (8), so that thereby the intermediate layer is heated and removed in the area of the welding location (12) and, subsequently, the cover sheet metals (1, 2), with the bonding sheet metal (8), are welded together by directly contacting one another, characterized in that the one welding electrode (10) contacts the second cover sheet metal (2) with a surface area that is at least 10 times greater than the cross-sectional surface area of the welding location (12), that the flowing current burns off the intermediate layer (5) in the area (11) of the welding location (12) by controlled heating of the cover sheet metal (1, 2) without melting it, and that, after completion of burning free the welding location, both cover sheet metals are brought into electrically conducting contact with the bonding sheet metal (8) only at the welding location (12) and are welded together with the latter.

2. The method according to claim 1, characterized in that for the large surface area contacting by the one welding electrode (10) a plate-shaped welding electrode or a ring-shaped welding electrode with a central support pin (10*b*) is used.

3. The method according to claim 1, characterized in that for the large surface area contacting by the one welding electrode (10) a lost sheet metal piece (13) is used between the welding electrode and the cover sheet metal (2) which piece is also connected by welding.

4. The method according to claim 1, characterized in that the other welding electrode (9) is a welding electrode with a spherical contact surface (9*a*).

5. The method according to claim 1, characterized in that an electrical bridge between the cover sheet metals (1, 2) and/or the sheet metal piece (13) and/or the bonding sheet metal (8) is used as the shunt.

6. The method according to claim 5, characterized in that at least one cover sheet metal (2) with knobs (3, 4) is used which are welded with their tips to the other cover sheet metal (1) and act as a shunt.

7. The method according to claim 1, wherein the combustible material is impregnated paper.

* * * * *